(12) United States Patent
Aronovich

(10) Patent No.: US 10,671,569 B2
(45) Date of Patent: *Jun. 2, 2020

(54) REDUCING ACTIVATION OF SIMILARITY SEARCH IN A DATA DEDUPLICATION SYSTEM

(71) Applicant: INTERNATIONAL BUSINESS MACHINES CORPORATION, Armonk, NY (US)

(72) Inventor: Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/416,147

(22) Filed: Jan. 26, 2017

(65) Prior Publication Data

US 2017/0132244 A1  May 11, 2017

Related U.S. Application Data

(63) Continuation of application No. 13/941,703, filed on Jul. 15, 2013.

(51) Int. Cl.
*G06F 16/17* (2019.01)
*G06F 16/174* (2019.01)
*G06F 16/14* (2019.01)
*G06F 16/2455* (2019.01)

(52) U.S. Cl.
CPC ........ *G06F 16/1752* (2019.01); *G06F 16/152* (2019.01); *G06F 16/1748* (2019.01); *G06F 16/24554* (2019.01)

(58) Field of Classification Search
CPC .................................................. G06F 16/1752
USPC .......................................................... 707/692
See application file for complete search history.

(56) References Cited

U.S. PATENT DOCUMENTS

| | | |
|---|---|---|
| 5,990,810 A | 11/1999 | Williams |
| 6,009,432 A | 12/1999 | Tarin |
| 6,810,398 B2 | 10/2004 | Moulton |
| 7,519,635 B1 | 4/2009 | Haustein et al. |
| 7,523,098 B2 | 4/2009 | Hirsch et al. |
| 7,694,191 B1 | 4/2010 | Bono et al. |
| 8,108,353 B2 | 1/2012 | Balachandran et al. |

(Continued)

FOREIGN PATENT DOCUMENTS

| | | |
|---|---|---|
| CN | 102811213 A | 12/2012 |
| EP | 1962209 A2 | 8/2008 |

(Continued)

OTHER PUBLICATIONS

Anonymous, "Framework for Stream De-duplication using Biased Reservoir-Sampling," http://priorartdatabase.com/IPCOM/000216344; Mar. 31, 2012.

(Continued)

*Primary Examiner* — Syling Yen
(74) *Attorney, Agent, or Firm* — Griffiths & Seaton PLLC

(57) ABSTRACT

For reducing activation of similarity search in a data deduplication system using a processor device in a computing environment, input data is partitioned into data chunks. A determination is made as to whether to apply a similarity search process for an input data chunk based on deduplication results of a previous input data chunk in the input data.

18 Claims, 7 Drawing Sheets

(56) References Cited

U.S. PATENT DOCUMENTS

| | | | |
|---|---|---|---|
| 8,200,923 B1 | 6/2012 | Healey et al. | |
| 8,224,848 B2 | 7/2012 | McCreight et al. | |
| 8,234,468 B1 | 7/2012 | Deshmukh et al. | |
| 8,285,957 B1 | 10/2012 | Nag et al. | |
| 8,412,848 B2 | 4/2013 | Therrien et al. | |
| 8,484,152 B2 | 7/2013 | Hoglund | |
| 8,712,963 B1 | 4/2014 | Douglis et al. | |
| 8,769,689 B2 | 7/2014 | Hoglund | |
| 8,832,035 B2 | 9/2014 | Raj et al. | |
| 8,918,390 B1 | 12/2014 | Shilane et al. | |
| 9,294,501 B2 | 3/2016 | Mesdaq et al. | |
| 2007/0005556 A1 | 1/2007 | Ganti et al. | |
| 2008/0013830 A1 | 1/2008 | Patterson et al. | |
| 2008/0294696 A1 | 11/2008 | Frandzel | |
| 2009/0234855 A1 | 9/2009 | Hirsch et al. | |
| 2009/0307251 A1 | 12/2009 | Heller et al. | |
| 2010/0058013 A1* | 3/2010 | Gelson | G06F 11/1453 711/162 |
| 2010/0088277 A1 | 4/2010 | Rao et al. | |
| 2010/0088296 A1 | 4/2010 | Periyagaram et al. | |
| 2010/0088349 A1 | 4/2010 | Parab | |
| 2010/0198797 A1 | 8/2010 | Wideman | |
| 2010/0318515 A1 | 12/2010 | Ramanathan et al. | |
| 2011/0016095 A1 | 1/2011 | Anglin et al. | |
| 2011/0040951 A1 | 2/2011 | Akirav et al. | |
| 2011/0099351 A1 | 4/2011 | Condict | |
| 2011/0185133 A1* | 7/2011 | Reiter | G06F 11/1453 711/156 |
| 2011/0185417 A1 | 7/2011 | Zhou et al. | |
| 2011/0238635 A1 | 9/2011 | Leppard | |
| 2011/0276781 A1 | 11/2011 | Sengupta et al. | |
| 2011/0296133 A1 | 12/2011 | Flynn et al. | |
| 2012/0023070 A1 | 1/2012 | Prahlad et al. | |
| 2012/0023112 A1 | 1/2012 | Levow et al. | |
| 2012/0089775 A1 | 4/2012 | Ranade et al. | |
| 2012/0143835 A1 | 6/2012 | Aronovich et al. | |
| 2012/0159098 A1 | 6/2012 | Cheung et al. | |
| 2012/0166401 A1 | 6/2012 | Li et al. | |
| 2012/0166448 A1 | 6/2012 | Li et al. | |
| 2012/0185612 A1 | 7/2012 | Zhang et al. | |
| 2012/0215789 A1 | 8/2012 | Ramanathan et al. | |
| 2012/0226697 A1 | 9/2012 | Chang et al. | |
| 2012/0239625 A1 | 9/2012 | Aronovich et al. | |
| 2012/0259825 A1 | 10/2012 | Tashiro et al. | |
| 2013/0018854 A1 | 1/2013 | Condict | |
| 2013/0018932 A1 | 1/2013 | Bhaskar et al. | |
| 2013/0198459 A1 | 8/2013 | Joshi et al. | |
| 2014/0040616 A1 | 2/2014 | Barber et al. | |
| 2014/0046909 A1 | 2/2014 | Patiejunas et al. | |
| 2014/0101398 A1 | 4/2014 | Mu | |
| 2014/0188822 A1 | 7/2014 | Das | |
| 2015/0033120 A1 | 1/2015 | Cooke et al. | |

FOREIGN PATENT DOCUMENTS

| | | |
|---|---|---|
| WO | 2012092348 A2 | 7/2012 |
| WO | 2012158654 A2 | 11/2012 |

OTHER PUBLICATIONS

Bhagwat et al., "Extreme Binning: Scalable, Parallel De-duplication for Chunk-based File Backup," Proceedings of the 17th IEEE/ACM International Symposium on Modeling, Analysis and Simulation of Computer and Telecommunication Systems (MASCOTS'2009), London, UK, Sep. 2009.

Zhu et al., "Avoiding the disk bottleneck in the Data Domain deduplication file system," In Proceedings of the 6th USENIX Conference on File and Storage Technologies (FAST) (San Jose, CA, USA, Feb. 2008), USENIX Association, pp. 269-282.

Lillibridge et al., "Sparse Indexing: Large scale, inline deduplication using sampling and locality," In Proceedings of the Eighth USENIX Conference on File and Storage Technologies (FAST), Feb. 2009, pp. 111-123.

Romanski et al., "Anchor-driven subchunk deduplication," In Proceedings of the 4th Annual International Conference on Systems and Storage (SYSTOR '11). ACM, New York, NY, USA, Article 16, 13 pages.

Muthitacharoen et al., "A low-bandwidth network file system," In Proceedings of the 18th ACM Symposium on Operating Systems Principles (SOSP) (Banff, Alberta, Canada, Oct. 2001), ACM Press, pp. 174-187.

Cai et al., "Research on Chunking Algorithms of Data De-Duplication," American Journal of Engineering and Technology Research vol. 11, No. 9, 2011.

\* cited by examiner

REDUCING ACTIVATION OF SIMILARITY SEARCH IN A DATA DEDUPLICATION SYSTEM

CROSS REFERENCE TO RELATED APPLICATIONS

This Application is a Continuation of U.S. patent application Ser. No. 13/941,703, filed on Jul. 15, 2013, which is cross-related to the following seventeen Applications listed as: U.S. patent application Ser. Nos. 13/941,873; 13/941,694; 13/941,886; 13/941,896; 13/941,951; 13/941,711; 13/941,958; 13/941,714; 13/941,742; 13/941,769; 13/941,782; 13/941,982; 13/941,800; 13/941,999; 13/942,009; 13/942,027; and 13/942,048, all of which were filed on even date and the entire contents of which are incorporated herein by reference and are relied upon for claiming the benefit of priority.

BACKGROUND OF THE INVENTION

Field of the Invention

The present invention relates in general to computers, and more particularly to reducing activation of similarity search in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for reducing activation of similarity search in a data deduplication system using a processor device in a computing environment. In one embodiment, by way of example only, the method comprises partitioning an input stream of data into input data chunks, the data chunks having a size of at least 16 Megabytes (MB); determining when and when not to apply the similarity search for an input data chunk based on a deduplication result of a previous input data chunk in the input stream of data; and avoiding the similarity search if the deduplication result of the previous input data chunk in the input stream of data is one of above and equal to a predetermined deduplication result threshold, thereby only calculating rolling hash values of the input data chunk when needed to be used in the similarity search in the data deduplication system of the computing environment.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
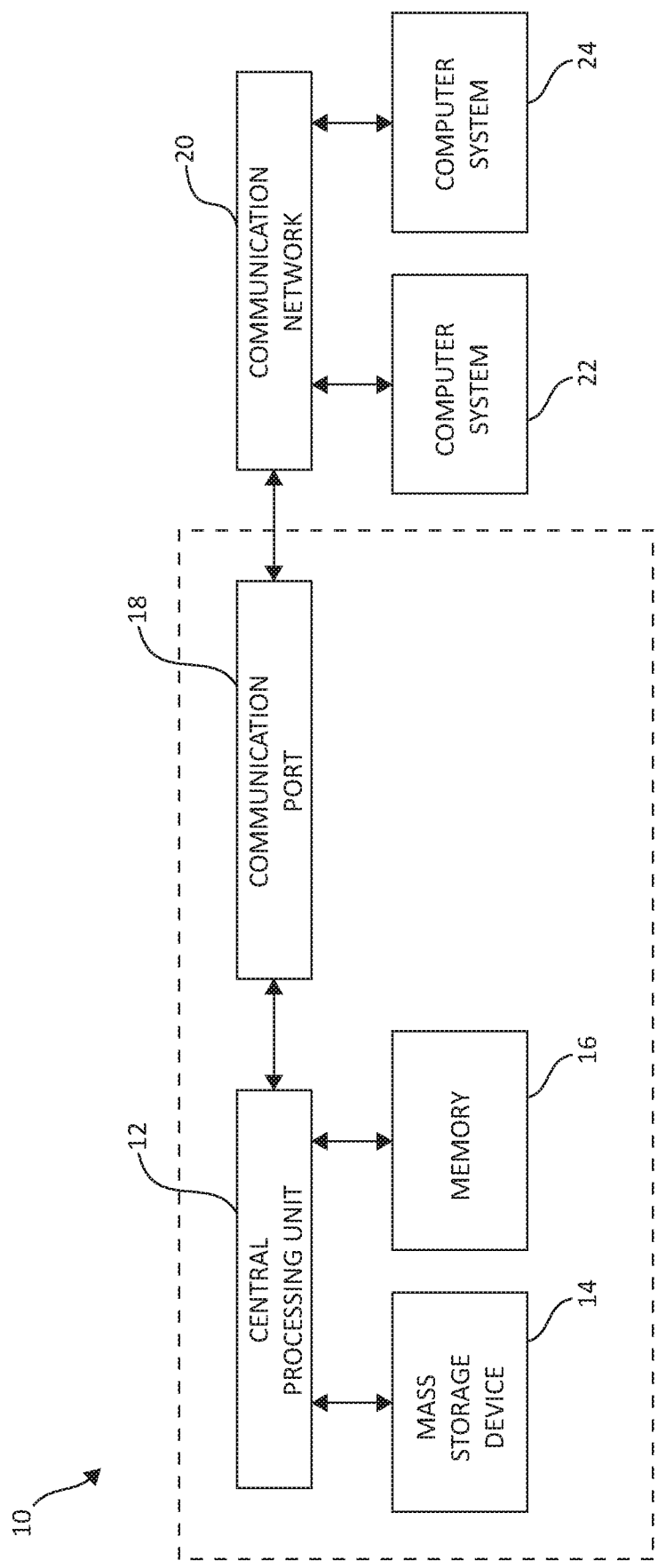
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.). In one embodiment, a deduplication storage system may be based on maintaining a search optimized index of values known as fingerprints or digests, where a (small) fingerprint represents a (larger) block of data in the repository. The fingerprint values may be cryptographic hash values calculated based on the blocks' data. In one embodiment, secure hash algorithm (SHA), e.g. SHA-1 or SHA-256, which are a family of cryptographic hash functions, may be used. Identifying fingerprint matches, using index lookup, enables to store references to data that already exists in a repository. In one embodiment, block boundaries may be determined based on the data itself.

To provide reasonable deduplication in this approach, the mean size of the data blocks based on which fingerprints are generated must be limited to smaller sizes and may not be too large. The reason being that a change of a bit within a data block will probabilistically change the data block's corresponding fingerprint, and thus having large data blocks makes the scheme more sensitive to updates in the data as compared to having small blocks. A typical data block size may range from 4 KB to 64 KB, depending on the type of application and workload. Thus, by way of example only, small data blocks may range in sizes of up to 64 KB, and large data blocks are those data blocks having a size larger than 64 KB.

To support very large repositories scaling to Petabytes (e.g., repositories scaling to at least one Petabyte), the number of fingerprints to store coupled with the size of a fingerprint (ranging between 16 bytes and 64 bytes), becomes prohibitive. For example, for 1 Petabyte of deduplicated data, with a 4 KB mean data block size, and 32 bytes fingerprint size (e.g. of SHA-256), the storage required to store the fingerprints is 8 Terabytes. Maintaining a search optimized data structure for such volumes of fingerprints is difficult, and requires optimization techniques. However existing optimization techniques do not scale to these sizes while maintaining performance. For this reason, to provide reasonable performance, the supported repositories have to be relatively small (on the order of tens of TB). Even for such smaller sizes, considerable challenges and run-time costs arise due to the large scale of the fingerprint indexes, that create a bottle-neck (e.g., chunk look disk bottleneck) in deduplication processing.

To solve this problem, in one embodiment, a deduplication system may be based on a two-step approach for searching data patterns during deduplication. In the first step, a large chunk of incoming data (e.g. a few megabytes) is searched in the repository for similar (rather than identical) data chunks of existing data, and the incoming data chunk is partitioned accordingly into intervals and paired with corresponding (similar) repository intervals. In the second step, a byte-wise matching algorithm is applied on pairs of similar intervals, to identify identical sub-intervals, which are already stored in a repository of data. The matching algorithm of the second step relies on reading all the relevant similar data in the repository in order to compare it byte-wise to the input data.

Yet, a problem stemming from a byte-wise comparison of data underlying the matching algorithm of the second step, is that data of roughly the same size and rate as the incoming data should be read from the repository, for comparison purposes. For example, a system processing 1 GB of incoming data per second, should read about 1 GB of data per second from the repository for byte-wise comparison. This requires substantially high capacities of I/O per second of the storage devices storing the repository data, which in turn increases their cost.

Additional trends in information technology coinciding with the above problem are the following: (1) Improvements in the computing ability by increasing CPU speeds and the number of CPU cores. (2) Increase in disk density, while disk throughput remains relatively constant or improving only modestly. This means that there are fewer spindles relative to the data capacity, thus practically reducing the overall throughput. Due to the problem specified above, there is a need to design an alternative solution, to be integrated in a two step deduplication system embodiment specified above, that does not require reading from the repository in high rates/volumes.

Therefore, in one embodiment, by way of example only, additional embodiments address these problem, as well as shifts resource consumption from disks to the CPUs, to benefit from the above trends. The embodiments described herein are integrated within the two-step and scalable deduplication embodiments embodiment described above, and uses a similarity search to focus lookup of digests during deduplication. In one embodiment, a global similarity search is used as a basis for focusing the similarity search for digests of repository data that is most likely to match input data.

The embodiments described herein significantly reduce the capacity of I/O per second required of underlying disks, benefit from the increases in computing ability and in disk density, and considerably reduce the costs of processing, as well as maintenance costs and environmental overhead (e.g. power consumption).

In one embodiment, input data is segmented into small segments (e.g. 4 KB) and a digest (a cryptographic hash value, e.g. SHA1) is calculated for each such segment. First, a similarity search algorithm, as described above, is applied on an input chunk of data (e.g. 16 MB), and the positions of the most similar reference data in the repository are located and found. These positions are then used to lookup the digests of the similar reference data. The digests of all the data contained in the repository are stored and retrieved in a form that corresponds to their occurrence in the data. Given a position of a section of data contained in the repository, the digests associated with the section of data are efficiently located in the repository and retrieved. Next, these reference digests are loaded into memory, and instead of comparing data to find matches, the input digests and the loaded reference digests are matched.

The described embodiments provide a new fundamental approach for architecting a data deduplication system, which integrates a scalable two step approach of similarity search followed by a search of identical matching segments, with an efficient and cost effective digest/fingerprint based matching algorithm (instead of byte-wise data comparison). The digest/fingerprint based matching algorithm enables to read only a small fraction (1%) of the volume of data required by byte-wise data comparison. The present invention proposed herein, a deduplication system can provide high scalability to very large data repositories, in addition to high efficiency and performance, and reduced costs of processing and hardware.

In one embodiment, by way of example only, the term "similar data" may be referred to as: for any given input data, data which is similar to the input data is defined as data which is mostly the same (i.e. not entirely but at least 50% similar) as the input data. From looking at the data in a binary view (perspective), this means that similar data is data where most (i.e. not entirely but at least 50% similar) of the bytes are the same as the input data.

In one embodiment, by way of example only, the term "similar search" may be referred to as the process of searching for data which is similar to input data in a repository of data. In one embodiment, this process may be performed using a search structure of similarity elements, which is maintained and searched within.

In one embodiment, by way of example only, the term "similarity elements" may be calculated based on the data and facilitate a global search for data which is similar to input data in a repository of data. In general, one or more similarity elements are calculated, and represent, a large (e.g. at least 16 MB) chunk of data.

Thus, the various embodiments described herein provide various solutions for digest retrieval based on a similarity search in deduplication processing in a data deduplication system using a processor device in a computing environment. In one embodiment, by way of example only, input data is partitioned into fixed sized data chunks. Similarity elements, digest block boundaries, and digest values are calculated for each of the fixed sized data chunks. Matching similarity elements are searched for in a search structure (i.e. index) containing the similarity elements for each of the fixed sized data chunks in a repository of data. Positions of similar data are located in a repository. The positions of the similar data are used to locate and load into the memory stored digest values and corresponding stored digest block boundaries of the similar data in the repository. The digest values and the corresponding digest block boundaries are matched with the stored digest values and the corresponding stored digest block boundaries to find data matches.

In one embodiment, the present invention provides a solution for utilizing a similarity search to load into memory the relevant digests from the repository, for efficient deduplication processing. In a data deduplication system, deduplication is performed by partitioning the data into large fixed sized chunks, and for each chunk, calculating (2 things—similarity elements and digest blocks/digest values) hash values (digest block/digest value) for similarity search and digest values. The data deduplication system searches for matching similarity values of the chunks in a search structure of similarity values, and finds the positions of similar data in the repository. The data deduplication system uses these positions of similar data to locate and load into memory stored digests of the similar repository data, and matching input and repository digest values to find data matches.

In one embodiment, the present invention provides for efficient calculation of both similarity search values and segmentation (i.e. boundaries) of digest blocks using a single linear calculation of rolling hash values. In a data deduplication system, the input data is partitioned into chunks, and for each chunk a set of rolling hash values is calculated. A single linear scan of the rolling hash values produces both similarity search values and boundaries of the digest blocks of the chunk. Each rolling hash value corresponds to a consecutive window of bytes in byte offsets. The similarity search values are used to search for similar data in the repository. The digest blocks segmentation is used to calculate digest block boundaries and corresponding digest values of the chunk, for digests matching. Each rolling hash value contributes to the calculation of the similarity values and to the calculation of the digest blocks segmentations. Each rolling hash value may be discarded after contributing to the calculations. The described embodiment provides significant processing efficiency and reduction of CPU consumption, as well as considerable performance improvement.

Thus, as described above, the deduplication approach of the present invention uses a two-step process for searching data patterns during deduplication. In the first step, a large chunk of incoming data (e.g. 16 megabytes "MB") is searched in the repository for similar (rather than identical) chunks of existing data, and the incoming chunk is partitioned accordingly into intervals, and paired with corresponding (similar) repository intervals. The similarity search structure (or "index") used in the first step is compact and simple to maintain and search within, because the elements used for a similarity search are very compact relative to the data they represent (e.g. 16 bytes representing 4 megabytes). Further included in the first step, in addition to a calculation of similarity elements, is a calculation of digest segments and respective digest values for the input chunk of data. All these calculations are based on a single calculation of rolling hash values. In the second step, reference digests of the similar repository intervals are retrieved, and then the input digests are matched with the reference digests, to identify data matches.

In one embodiment, in the similarity based deduplication approach as described herein, a stream of input data is partitioned into chunks (e.g. at least 16 MB), and each chunk is processed in two main steps. In the first step a similarity search process is applied, and positions of the most similar reference data in the repository are found. Within this step both similarity search elements and digest segments boundaries are calculated for the input chunk, based on a single linear calculation of rolling hash values. Digest values are calculated for the input chunk based on the produced segmentation, and stored in memory in the sequence of their occurrence in the input data. The positions of similar data are then used to lookup the digests of the similar reference data and load these digests into memory, also in a sequential form. Then, the input digests are matched with the reference digests to form data matches.

When deduplication of an input chunk of data is complete, the digests associated with the input chunk of data are stored in the repository, to serve as reference digests for subsequent input data. The digests are stored in a linear form, which is independent of the deduplicated form by which the data these digests describe is stored, and in the sequence of their occurrence in the data. This method of storage enables efficient retrieval of sections of digests, independent of fragmentation characterizing deduplicated storage forms, and thus low on IO and computational resource consumption.

While the above process is efficient, specific properties of backup environments can be leveraged to further improve the efficiency of the solution. An important observation, which has been proven to be highly characteristic of backup environments, is that when an interval of repository data is identified as similar to a chunk of input data, there is considerably high probability that the data following this interval in the repository will be referenced shortly after by subsequent input data. This important property enables designing a solution where the similarity search step can be avoided as long as deduplication of the input data, based on previously determined references, is producing good results. In one embodiment, by way of example only, one example of good deduplication results is coverage of the input chunk of data, with matches to repository data, equal to and/or exceeding 70% of the size of the input chunk of data. This optimization saves considerable resources during run-time (e.g. IO operations, CPU consumption, networking consumption, serialization), as well as provides a layer of protection from possible spurious similarity search results (workloads which are more difficult for deduplication may produce at times spurious similarity search results), thus also improving the deduplication results.

Furthermore, in cases where the similarity search step is avoided, the calculation of the similarity elements is practically not required. Designing a way to also remove the need to calculate segmentation of the input data to digest segments, will enable to entirely avoid the calculation of the rolling hash values for chunks of input data. Since calculation of rolling hash values (i.e. a hash value for each seed at each byte offset of the input data), is a computationally intense operation, avoiding it will result in considerable improvement in the efficiency of the deduplication process. Therefore, an additional problem in this context is how to calculate digest segments and respective digest values for the input data, where similarity search is avoided.

The present invention provides a solution for both these problems. In one embodiment, the present invention provides a first algorithm enabling to reduce the frequency of applying similarity search for input data, and then a second algorithm enables to calculate digest segments and respective digest values for input data, without calculating rolling hash values. The algorithms of the present invention provide considerable additional efficiency and effectiveness of the deduplication process.

In one embodiment of the present invention, a stream of input data is partitioned into chunks (e.g. 16 MB), and the stream is assigned with a dedicated data structure, denoted as "reference set", which contains a current set of positions into the repository data, where each position starts an interval of repository data identified as similar to the last chunk of data in the input stream. This data structure also contains a measure of the goodness of the deduplication result of the last chunk of data in the input stream. At initiation the set of positions is empty, and the measure of deduplication result is set to nil.

In one embodiment, a deduplication process receives a chunk of input data, associated with a specific input stream, and determines whether to activate similarity search for the input chunk, based on the information in the reference set data structure. If the measure of goodness of the deduplication result is low (e.g. below a predetermined deduplication result threshold) or nil, then similarity search is activated, and its results, namely the positions associated with the set of repository intervals which are identified as similar, are inserted into the reference set, replacing previous contents of the reference set if exists. Within the similarity search calculations, also digest segments boundaries and respective digest values are calculated for the input chunk, based on the calculated rolling hash values. If, on the other hand, the measure of goodness of the deduplication result is sufficiently high (e.g., above a predetermined deduplication result threshold), also implying that the set of positions in the reference set is not empty, then similarity search is avoided, and the positions in the reference set are updated, to reflect repository intervals immediately following the previous repository intervals.

In one embodiment, the positions of the similar repository data intervals are then used to lookup their respective digests and load these digests into memory for matching. When deduplication processing of an input chunk of data completes, the measure of goodness of the deduplication result is calculated for the input chunk, and updated in the reference set data structure. If the measure of goodness of the deduplication result of the input chunk is low, and the input chunk was processed without similarity search, then the input chunk is reprocessed with similarity search.

In cases where similarity search is avoided, digest segments boundaries are calculated by determining appropriate anchor positions in the input chunk and in the similar reference intervals, and projecting the segmentations of the reference intervals on the input chunk. For each projected segmentation, respective digest values are calculated, and then used for matching with the repository digests. Thus, the algorithms of the present invention considerably increase the efficiency, throughput and effectiveness of the deduplication process.

In one embodiment, focusing on a conditional activation of similarity search for an input chunk based on the deduplication result of a previous chunk in the input stream, a stream of input data is partitioned into chunks, and a determination is made as to whether to apply similarity search for an input chunk based on the deduplication result of a previous chunk in the input stream. If the deduplication result of a previous chunk in the input stream is not sufficiently high or does not exist, then similarity search is applied. If the deduplication result of a previous chunk in the input stream is sufficiently high then similarity search is avoided. In one embodiment, specifications of the similar intervals produced by similarity search are stored in a reference set data structure associated with the input stream, replacing any previous contents, if exists, in the reference set data structure. The positions of the current similar intervals in the repository are calculated based on the positions of previous similar intervals in the repository, by incrementing the positions of the previous similar intervals to reflect current similar intervals immediately following the previous similar intervals. The deduplication result of a previous chunk in the input stream is defined as the total matched size of the chunk divided by the total size of the chunk. The total matched size of a chunk in the input stream is defined as the total size of the portions of the chunk, which are covered by matches to repository data. If the deduplication result of a current input chunk is not sufficiently high after deduplication processing without similarity search, then the input chunk is reprocessed with similarity search applied.

In one embodiment, focusing on the calculation of candidate digest segmentations for an input chunk, based on information of similar repository intervals, and without calculating rolling hash values for the input chunk, the present invention activates the calculation algorithm in cases where similarity search is avoided, thus also avoiding the rolling hash calculation for the input chunk. In one embodiment, a stream of input data is partitioned into chunks, and repository intervals, which are similar to an input chunk, are determined. Then for each similar repository interval, its digest segmentation is projected onto the input chunk starting at an anchor position, thus forming a plurality of alternative digest segmentations for the input chunk. In one embodiment, an anchor position is defined as a pair of ending positions of a last data match, in the input data and in the repository data, calculated between a previous chunk in the same input stream and a previous similar repository interval, whose ending positions in the input stream and in the repository data are closest to the starting positions of the current input chunk and of the current similar repository interval respectively. The position and size of the last data match for each similar repository interval are stored for each input stream. The projection of a digest segmentation onto the input chunk is done based on the positions and sizes of the digest segments following an anchor position. Namely, the positions and sizes of the digest segments of a similar repository interval, starting at an anchor position, are projected onto the input chunk, starting at the respective anchor position. A candidate digest segmentation is calculated for the input chunk based on each one of the similar intervals, and respective digest values are computed using each candidate segmentation. The candidate segmentation that produced the best deduplication ratio for the input chunk is selected for storage. If the input chunk is partitioned into sub-sections, such that each sub-section has its own set of similar repository intervals, then the digest segmentations selected for each sub-section are concatenated into a single digest segmentation.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
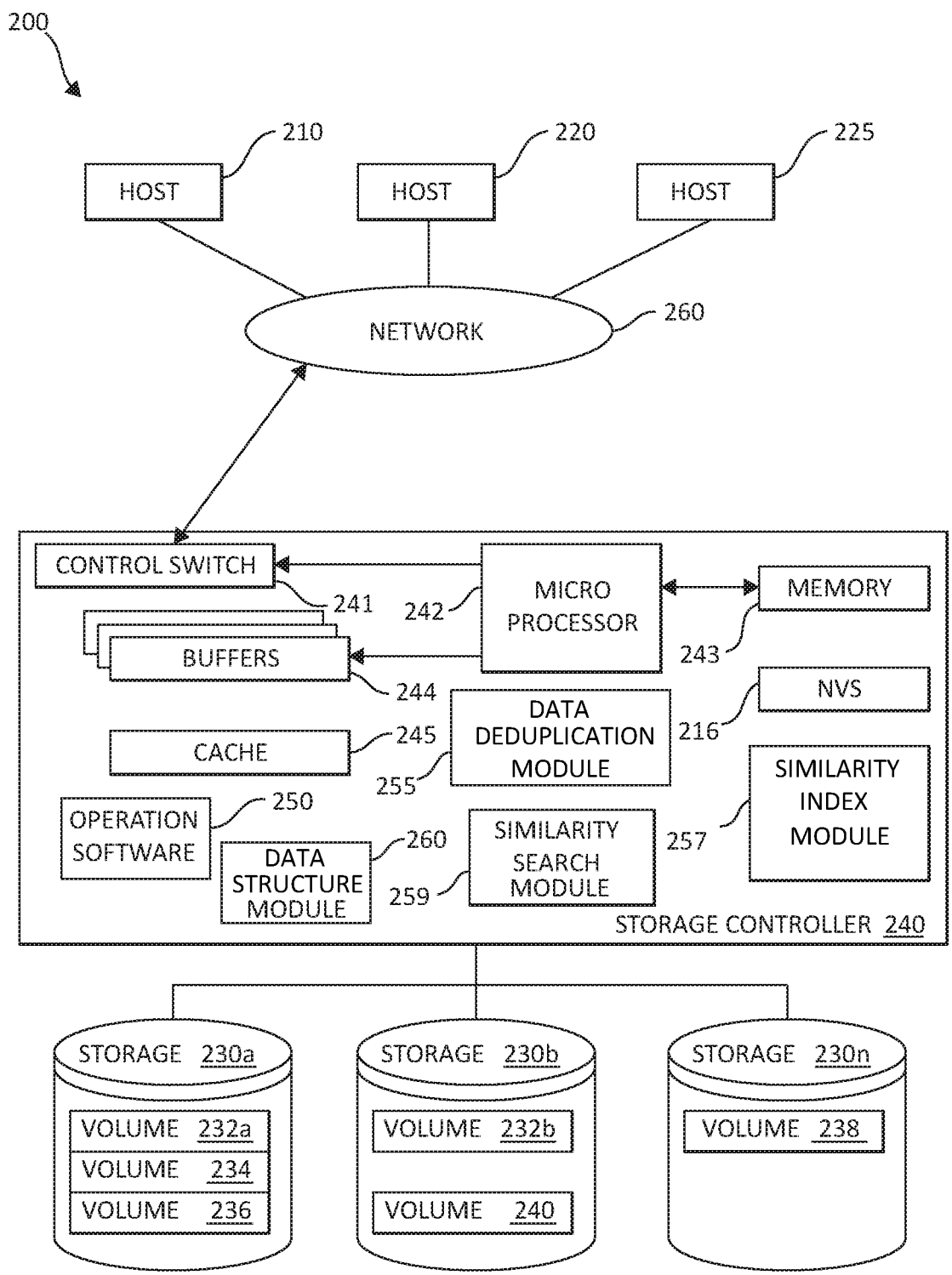
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a similarity index module 257 (e.g., a similarity search structure), a similarity search module 259, and a data structure module 260 (e.g., a reference set data structure). The data duplication module 255, the similarity index module 257, the similarity search module 259, and the data structure module 260 may work in conjunction with each and every component of the storage controller 240, the hosts 210, 220, 225, and storage devices 230. The data duplication module 255, the similarity index module 257, the similarity search module 259, and the data structure module 260 may be structurally one complete module or may be associated and/or included with other individual modules. The data duplication module 255, the similarity index module 257, the similarity search module 259, and the data structure module 260 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the similarity index module 257, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255, the similarity index module 257, the similarity search module 259, and the data structure module 260 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255, the similarity index module 257, the similarity search module 259, and the data structure module 260 may also be located in the cache 245 or other components. As such, the data duplication module 255, the similarity index module 257, the similarity search module 259, and the data structure module 260 may be used as needed, based upon the storage architecture and users preferences.

As mentioned above, in one embodiment, the input data is partitioned into large fixed size chunks (e.g. 16 MB), and a similarity search procedure is applied for each input chunk. A similarity search procedure calculates compact similarity elements, based on the input chunk of data, and searches for matching similarity elements stored in a compact search structure (i.e. index) in the repository. The size of the similarity elements stored for each chunk of data is typically 32 bytes (where the chunk size is a few megabytes), thus making the search structure storing the similarity elements very compact and simple to maintain and search within.

The similarity elements are calculated by calculating rolling hash values on the chunk's data, namely producing a rolling hash value for each consecutive window of bytes in a byte offset, and then selecting specific hash values and associated positions (not necessarily the exact positions of these hash values) to be the similarity elements of the chunk.

One important aspect and novelty provided by the present invention is that a single linear calculation of rolling hash values, which is a computationally expensive operation, serves as basis for calculating both the similarity elements of a chunk (for a similarity search) and the segmentation of the chunk's data into digest blocks (for finding exact matches). Each rolling hash value is added to the calculation of the similarity elements as well as to the calculation of the digest blocks segmentation. After being added to the two calculations, a rolling hash value can be discarded, as the need to store the rolling hash values is minimized or eliminated. This algorithmic element provides significant efficiency and reduction of CPU consumption, as well as considerable performance improvement.

In one embodiment, the similarity search procedure of the present invention produces two types of output. The first type of output is a set of positions of the most similar reference data in the repository. The second type of output is the digests of the input chunk, comprising of the segmentation to digest blocks and the digest values corresponding to the digest blocks, where the digest values are calculated based on the data of the digest blocks.

In one embodiment, the digests are stored in the repository in a form that corresponds to the digests occurrence in the data. Given a position in the repository and size of a section of data, the location in the repository of the digests corresponding to that interval of data is efficiently determined. The positions produced by the similarity search procedure are then used to lookup the stored digests of the similar reference data, and to load these reference digests into memory. Then, rather than comparing data, the input digests and the loaded reference digests are matched. The matching process is performed by loading the reference digests into a compact search structure of digests in memory, and then for each input digest, querying the search structure of digests for existence of that digest value. Search in the search structure of digests is performed based on the digest values. If a match is found, then the input data associated with that digest is determined to be found in the repository and the position of the input data in the repository is determined based on the reference digest's position in the repository. In this case, the identity between the input data covered by the input digest, and the repository data covered by the matching reference digest, is recorded. If a match is not found then the input data associated with that digest is determined to be not found in the repository, and is recorded as new data. In one embodiment, the similarity search structure is a global search structure of similarity elements, and a memory search structure of digests' is a local search structure of digests in memory. The search in the memory search structure of digests is performed by the digest values.

Figure 3:
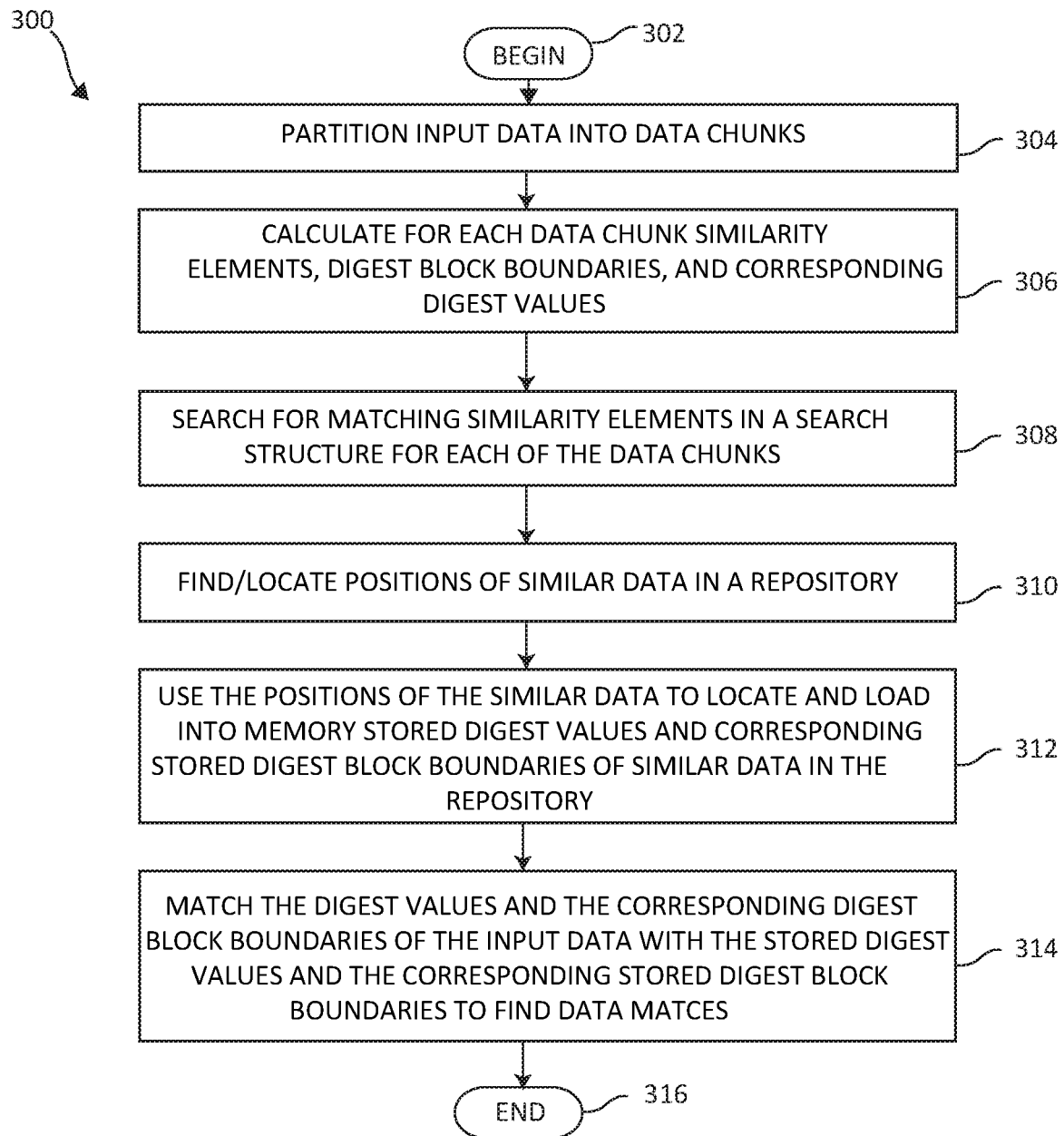
FIG. 3 is a flowchart illustrating an exemplary method for digest retrieval based on similarity search in deduplication processing in a data deduplication system in which aspects of the present invention may be realized.

FIG. 3 is a flowchart illustrating an exemplary method 300 for digest retrieval based on similarity search in deduplication processing in a data deduplication system in which aspects of the present invention may be realized. The method 300 begins (step 302). The method 300 partitions input data into data chunks (step 304). The input data may be partitioned into fixed sized data chunks. The method 300 calculates, for each of the data chunks, similarity elements, digest block boundaries, and corresponding digest values are calculated (step 306). The method 300 searches for matching similarity elements in a search structure (i.e. index) for each of the data chunks (which may be fixed size data chunks) (step 308). The positions of the similar data in a repository (e.g., a repository of data) are located (step 310). The method 300 uses the positions of the similar data to locate and load into memory stored digest values and corresponding stored digest block boundaries of the similar data in the repository (step 312). The method 300 matches the digest values and the corresponding digest block boundaries of the input data with the stored digest values and the corresponding stored digest block boundaries to find data matches (step 314). The method 300 ends (step 316).

Figure 4:
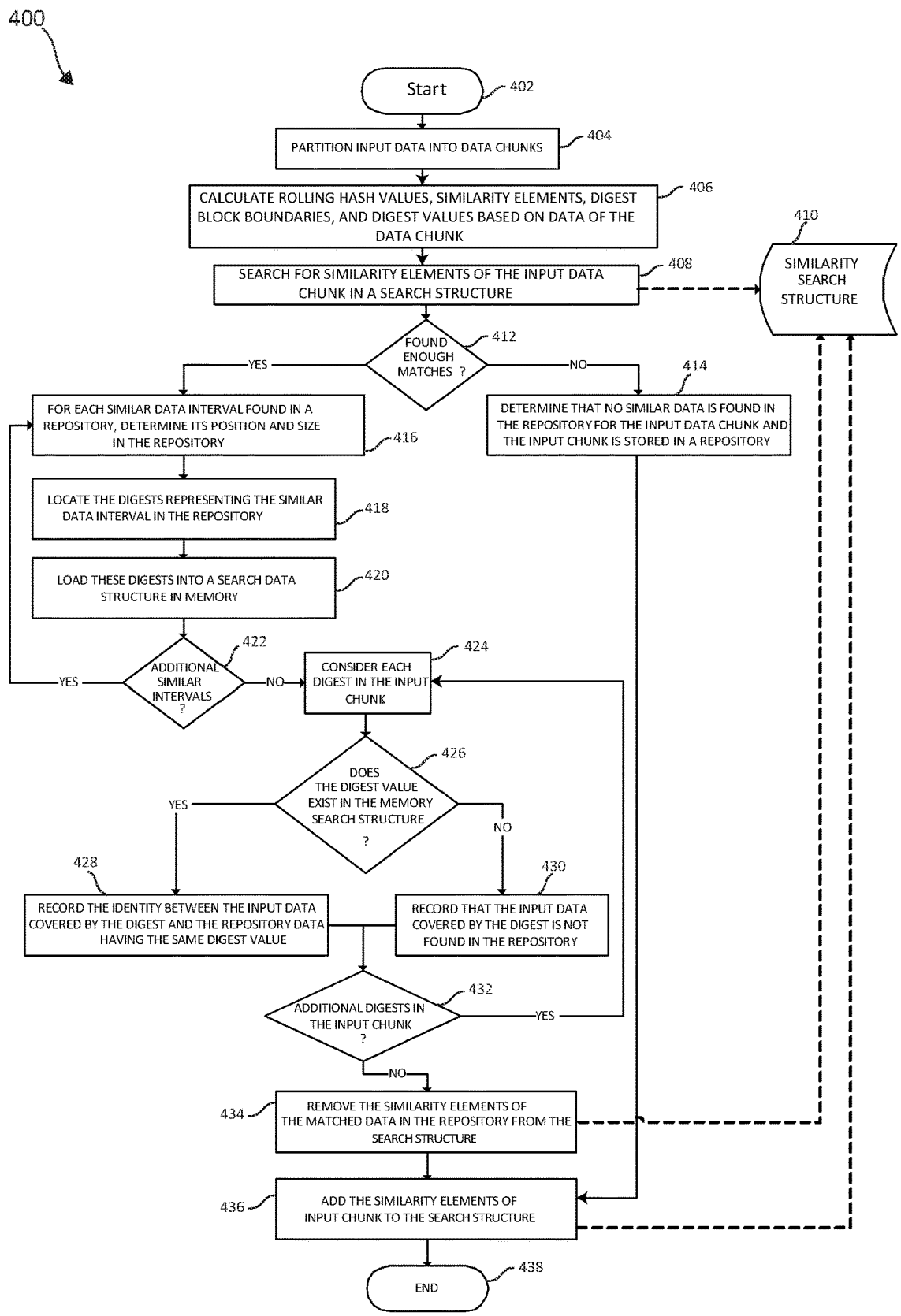
FIG. 4 is a flowchart illustrating an exemplary alternative method for digest retrieval based on similarity search in deduplication processing in a data deduplication system in which aspects of the present invention may be realized.

FIG. 4 is a flowchart illustrating an exemplary alternative method 400 for digest retrieval based on similarity search in deduplication processing in a data deduplication system in which aspects of the present invention may be realized. The method 400 begins (step 402). The method 400 partitions the input data into chunks (e.g., partitions the input data into large fixed size chunks) (step 404), and for an input data chunk calculates rolling hash values, similarity elements, digest block boundaries, and digest values based on data of the input data chunk (step 406). The method 400 searches for similarity elements of the input data chunk in a similarity search structure (i.e. index) (step 408 and 410). The method 400 determines if there are enough or a sufficient amount of matching similarity elements (step 412). If not enough matching similarity elements are found then the method 400 determines that no similar data is found in the repository for the input data chunk, and the data of the input chunk is stored in a repository (step 414) and then the method 400 ends (step 438). If enough similarity elements are found, then for each similar data interval found in a repository, the method 400 determines the position and size of each similar data interval in the repository (step 416). The method 400 locates the digests representing the similar data interval in the repository (step 418). The method 400 loads these digests into a search data structure of digests in memory (step 420). The method 400 determines if there are any additional similar data intervals (step 422). If yes, the method 400 returns to step 416. If no, the method 400 considers each digest of the input data chunk (step 424). The method 400 determines if the digest value exists in the memory search structure of digests (step 426). If yes, the method 400 records the identity between the input data covered by the digest and the repository data having the matching digest value (step 428). If no, the method 400 records that the input data covered by the digest is not found in the repository (step 430). From both steps 428 and 430, the method 400 determines if there are additional digests of the input data chunk (step 432). If yes, the method 400 returns to step 424. If no, method 400 removes the similarity elements of the matched data in the repository from the similarity search structure (step 434 and step 410). The method 400 adds the similarity elements of the input data chunk to the similarity search structure (step 436). The method 400 ends (step 438).

Figure 5:
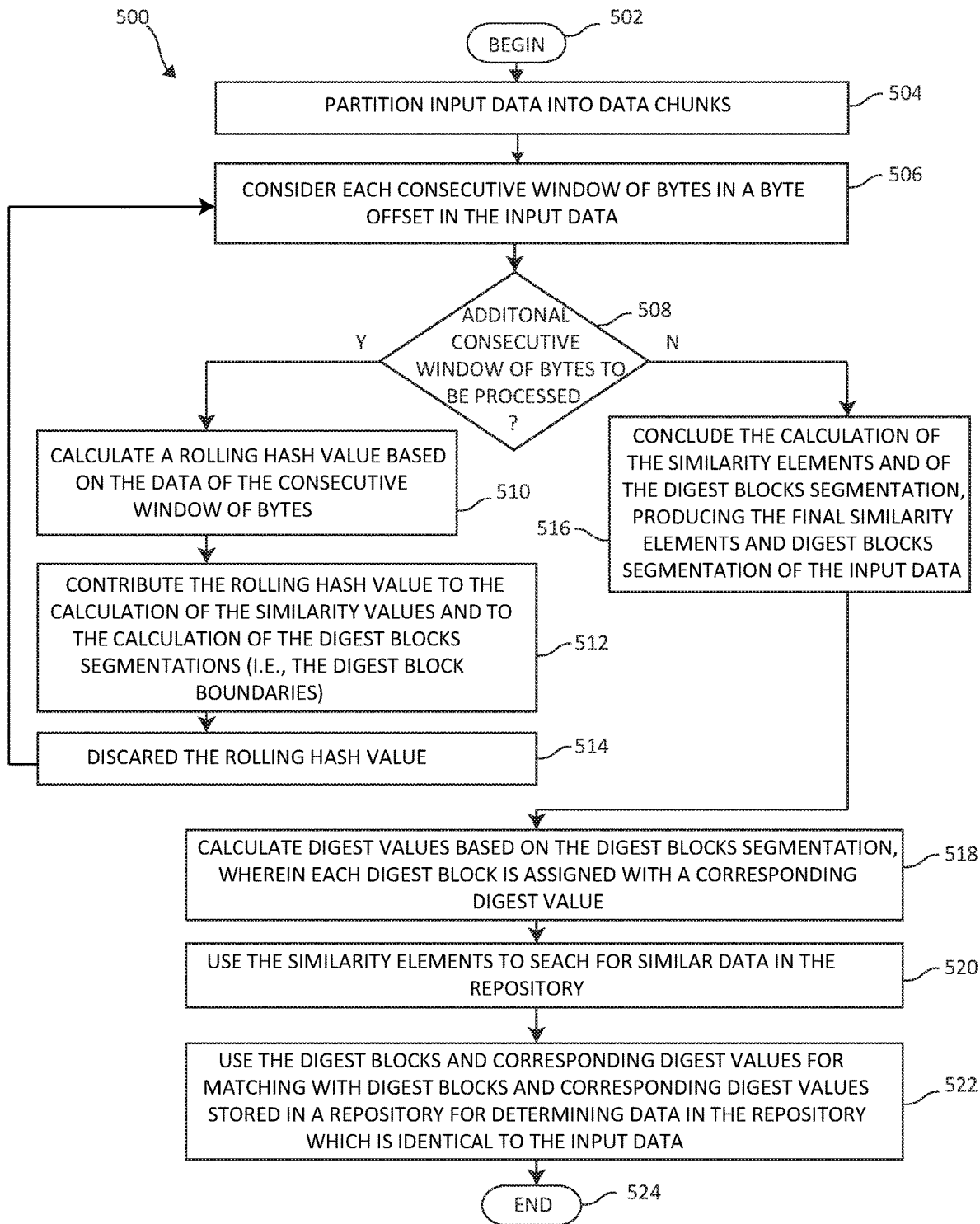
FIG. 5 is a flowchart illustrating an exemplary method for efficient calculation of both similarity search values and boundaries of digest blocks using a single linear calculation of rolling hash values in a data deduplication system in which aspects of the present invention may be realized.

FIG. 5 is a flowchart illustrating an exemplary method 500 for efficient calculation of both similarity search values and boundaries of digest blocks using a single linear calculation of rolling hash values in a data deduplication system in which aspects of the present invention may be realized. The method 500 begins (step 502). The method 500 partitions input data into data chunks (steps 504). The data chunks may be fixed sized data chunks. The method 500 considers each consecutive window of bytes in a byte offset in the input data (step 506). The method 500 determines if there is an additional consecutive window of bytes to be processed (step 508). If yes, the method 500 calculates a rolling hash value based on the data of the consecutive window of bytes (step 510). The method 500 contributes the rolling hash value to the calculation of the similarity values and to the calculation of the digest blocks segmentations (i.e., the digest block boundaries) (step 512). The method 500 discards the rolling hash value (step 514), and returns to step 506. If no, the method 500 concludes the calculation of the similarity elements and of the digest blocks segmentation, producing the final similarity elements and digest blocks segmentation of the input data (step 516). The method 500 calculates digest values based on the digest blocks segmentation, wherein each digest block is assigned with a corresponding digest value (step 518). The similarity elements are used to search for similar data in the repository (step 520). The digest blocks and corresponding digest values are used for matching with digest blocks and corresponding digest values stored in a repository for determining data in the repository which is identical to the input data (step 522). The method 500 ends (step 524).

As mentioned above, in one embodiment, each input stream of data is assigned with a dedicated data structure, denoted as a "reference set", which contains a current set of positions into the repository data, where each position starts an interval of repository data identified as similar to the last chunk of data in the input stream. This data structure also contains a measure of the goodness of the deduplication result of the previous chunk of data in the input stream, which is defined as the deduplication ratio of the previous chunk, namely the total size of the portions of the previous chunk which are covered by matches to repository data divided by the total size of the previous chunk. In one embodiment, the deduplication ratio value is defined as sufficiently good if it is not less than a predefined threshold. An example of a predefined threshold would be 70%. If the deduplication ratio value is less than the predefined threshold then the deduplication ratio value is defined as not sufficiently good (e.g., less than the predefined threshold).

A deduplication process receives a chunk of input data, associated with a specific input stream, and determines whether to activate similarity search for the input chunk, based on the information in the reference set data structure. In one embodiment, two states are defined as follows: A "reference set recalculation state" is applied at the beginning of an input stream, and in cases where deduplication processing of an input chunk did not yield a sufficiently good deduplication result. This state triggers activation of similarity search for an input chunk. A "valid reference set state" is applied when processing an input chunk which is not at the beginning of an input stream, and where deduplication processing of the previous chunk in the input stream provided a sufficiently good deduplication result. In this state, similarity search is avoided. The state changes from reference set recalculation to valid reference set when the deduplication result of an input chunk is sufficiently good; and changes back to reference set recalculation when the deduplication result of an input chunk is not sufficiently good.

As described in FIG. 6, below, the method of the present invention receives as input an input chunk of data associated with a specific stream of input data, and a reference set data structure associated with the input stream. If the measure of deduplication result in the reference set is not sufficiently high or nil, then the method performs the following: activates a similarity search for the input chunk, and obtains a list of similar repository intervals, where each interval is specified by a position and size; and stores the specifications of the similar intervals in the reference set data structure, replacing any previous contents in the reference set data structure if exists. Within similarity search, the following are calculated for the input chunk (based on calculation of rolling hash values): similarity elements, digest segments boundaries and respective digests values.

If the measure of deduplication result in the reference set is sufficiently high, the method advances the positions in the reference set data structure to reflect repository intervals immediately following the current repository intervals, and calculates digest segments boundaries and respective digest values for the input chunk based on information of the calculated similar repository intervals. The method to achieve this is elaborated in the following.

In one embodiment, the similar intervals specified in the reference set data structure are scanned and their associated digests are loaded from the repository into memory. The digests of separate repository intervals are read in parallel. The method of the present invention then matches the input and the repository digests to find data matches, and calculates a measure of goodness of the deduplication result of the current input chunk. The measure is defined as the deduplication ratio of the chunk, which is the total size of the portions of the chunk that are matched with repository data divided by the total size of the chunk. The measure value is stored in the reference set data structure. If the measure of goodness of the deduplication result is not sufficiently high and the input chunk was processed without similarity search, then the method of the present invention reprocesses the input chunk with application of similarity search.

If the measure of goodness of the deduplication result is sufficiently high or the input chunk was processed with similarity search, then the method of the present invention stores the digest segments boundaries and respective digest values of the input chunk in the repository, and also stores the data of the input chunk in the repository in a deduplicated form, using the data matches and mismatches calculated for the input chunk. Specifically, mismatched input data is stored, and matched input data is recorded as references to matched repository data.

Figure 6:
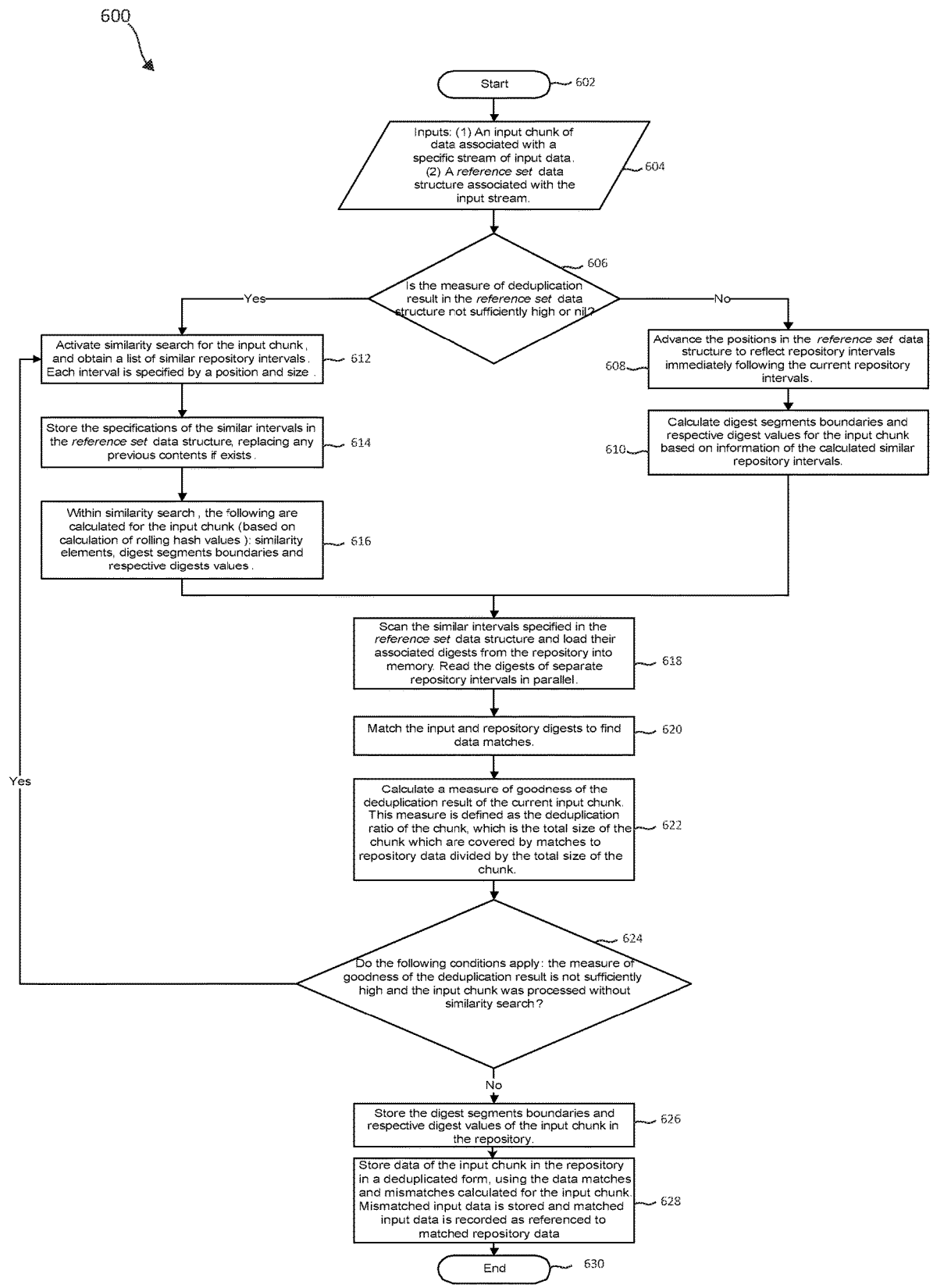
FIG. 6 is a flowchart illustrating an exemplary method 600 for deduplication processing of an input data chunk in a data deduplication system in which aspects of the present invention may be realized.

FIG. 6 is a flowchart illustrating an exemplary method 600 for deduplication processing of an input data chunk in a data deduplication system in which aspects of the present invention may be realized. In other words, FIG. 6 is flowchart illustrating an exemplary method 600 for deduplication processing of an input chunk with conditional activation of similarity search. The method 600 begins (step 602). The method 600 assigns each input stream of data with a dedicated data structure, denoted as a "reference set," which contains a current set of positions into the repository data, where each position starts an interval of repository data identified as similar to the last chunk of data in the input stream, and also contains a measure of the goodness of the deduplication result of the last chunk of data in the input stream. The method 600 receives as input an input chunk of data associated with a specific stream of input data, and a reference set data structure associated with the input stream (step 604). The method 600 determines if the measure value of deduplication result in the reference set data structure is not sufficiently high (e.g., below a predetermined deduplication result threshold) or nil (step 606). An example value of a predetermined threshold for the deduplication result is 70%. If no, the method 600 advances the positions in the reference set data structure to reflect repository intervals immediately following the current repository intervals (step 608). The method 600 then calculates digest segments boundaries and respective digest values for the input chunk based on information of the calculated similar repository intervals (step 610). Returning to step 606, if yes, the method 600 activates a similarity search for the input data chunk and obtains a list of similar repository intervals (step 612). Each interval is specified by a position and a size. The method 600 then stores the specifications of the similar intervals in the reference set data structure and replaces any previous contents, if existing, in the reference set data structure (step 614). The method 600 calculates for the input chunk, within the similarity search, based on calculated rolling hash values, similarity elements, digest segments boundaries, and respective digests values (step 616). From both step 616 and 610, the method 600 then scans the similar intervals specified in the reference set data structure, and loads the digests associated with the similar intervals from the repository into a memory, and reads the digests of separate repository intervals in parallel (step 618). The method 600 matches the input and the repository digests to find data matches (step 620). The method 600 calculates a measure value of the goodness of the deduplication result of the current input chunk, and stores the measure value in the reference set data structure (step 622). This measure is defined, in one embodiment, as the deduplication ratio of the chunk, which is the total size of the portions of the chunk that are covered by matches to repository data divided by the total size of the chunk. The method 600 then determines if the following conditions apply: the measure of goodness of the deduplication results is not sufficiently high and the input data chunk was processed without similarity search (step 624). If yes, the method 600 returns to step 612. If no, the method 600 stores the digest segments boundaries and respective digest values of the input data chunk in the repository (step 626). The method 600 stores the data of the input chunk in the repository in a deduplicated form, using the data matches and mismatches calculated for the input chunk. Mismatched input data is stored, and matched input data is recorded as references to matched repository data (step 628). The method 600 ends (step 630).

A further problem which should be solved is how to calculate digest segments boundaries and respective digest values for an input chunk based on information of the identified similar repository intervals, and without calculating rolling hash values for the input chunk (rolling hash values normally serve as basis for calculating digest segments, which then enable to calculate respective digest values). A method to solve this problem is required for step 610 (see FIG. 6 step 610) in the algorithm specified above, and will be activated in cases where similarity search is avoided, thus also avoiding the rolling hash calculation for the input chunk.

Figure 7:
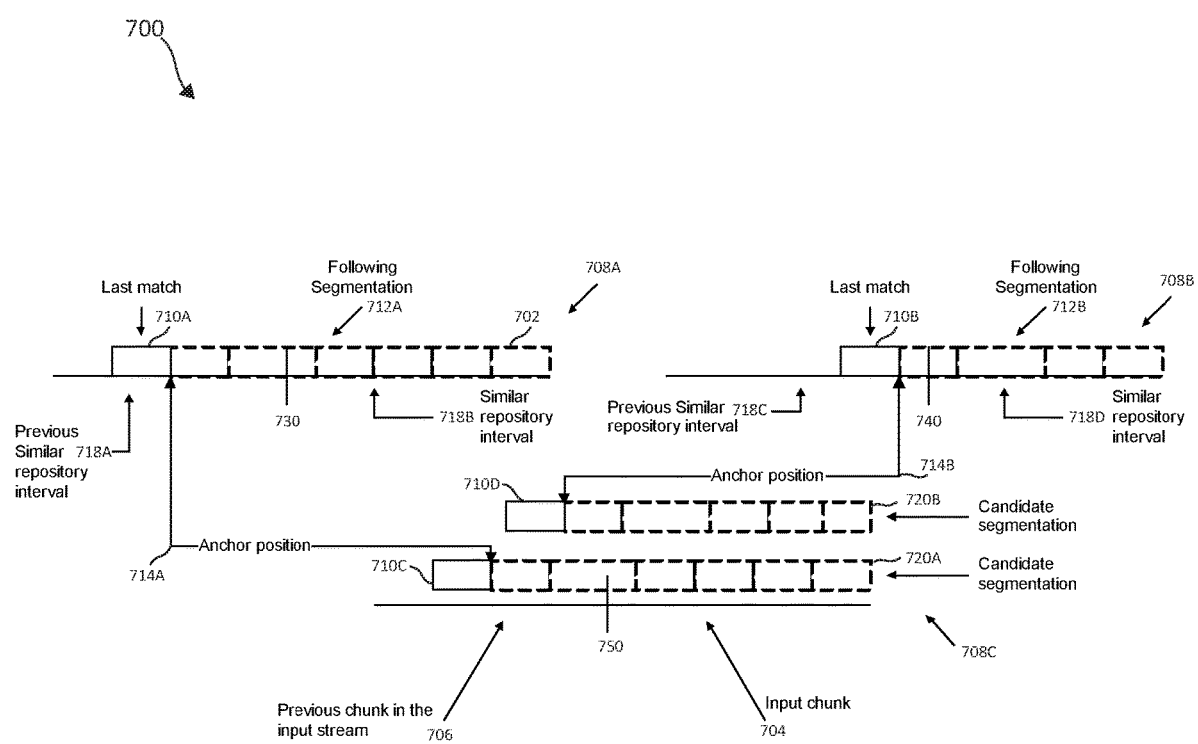
FIG. 7 is a flowchart illustrating an exemplary method for calculating candidate segmentations for an input data chunk in a data deduplication system in which aspects of the present invention may be realized.

In one embodiment, the present invention provides an algorithm to solve this problem. Turning now to FIG. 7 a block diagram illustrating an exemplary method 700 for calculating candidate segmentations for an input data chunk in a data deduplication system in which aspects of the present invention may be realized, is illustrated. For each similar repository interval 718B and 718D, an anchor position 714 (illustrated in FIG. 7 with 714A-B) is identified based on the information of data matches 710 (illustrated in FIG. 7 with 710A-D) previously calculated. In FIG. 7, the two rectangles at the left side of the bottom tips of lines 714A-B are marked as 710C and 710D. These are the portions of the input data covered by the matches whose repository portions are marked with 710A and 710B. An anchor position 714 is defined, in one embodiment, as a pair of ending positions of a data match in the input data and in the repository data 714A-B, calculated between a previous chunk in the same input stream 706 and a previous similar repository interval 718A and 718C, whose ending positions in the input stream and in the repository data 714A-B are closest to the starting positions of the input chunk 704 and of the similar repository interval 718B and 718D respectively. The 3 vertical lines 730, 740, and 750 partition in half the 3 horizontal lines 708A-C), where the horizontal lines 708 represent data intervals, the bottom line 750 is the input data and the top two lines (730 and 740) are similar repository data. The vertical lines 730, 750 partition the data intervals to the current input chunk and similar data—on the right side, and the previous input chunk and similar data—on the left side.

The specifications (i.e. position and size) of the last data match 710A-D for each similar repository interval 718B and 718D are stored in a reference set data structure for each similar repository interval, upon completion of deduplication of each input chunk 704. This information is then available for usage by this algorithm for the next input chunk, in cases where similarity search is avoided. For each similar repository interval 718B and 718D, an anchor position 714A and 714B is identified as specified above, and then the digest segmentation of the repository data 712A and 712B starting at the anchor position 714A and 714B is projected onto the input chunk 704 to form a segmentation on the input chunk 720A and 720B. Projection is done based on the positions and sizes of the digest segments 712A and 712B following an anchor position 714A and 714B. Therefore, for each similar interval 718B and 718D, a candidate digest segmentation 720A and 720B is calculated for the input chunk 704, and respective digest values are computed. In the next step, the digests of the candidate segmentations 720A and 720B calculated for the input chunk 704 are matched with the digests of the similar repository intervals 718B and 718D, and data matches are calculated (step 620 in FIG. 6).

In one embodiment of the present invention, in the algorithm of calculating candidate segmentations 720, all the candidate segmentations of the input chunk 704 are essentially equivalent in their importance. So an arising problem is which segmentation of the input chunk should be stored, to serve as basis for deduplication of subsequent input chunks. In one embodiment, in the algorithm of the present invention, the candidate segmentation 720 that produced the most comprehensive coverage of the input chunk 704 with matches (i.e. produced the best deduplication ratio) is selected for storage. If the input chunk 704 is partitioned into sub-sections, such that each sub-section has its own set of similar repository intervals 718B and 718D, then the segmentations selected for each sub-section are concatenated into a single segmentation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for conditional activation of a similarity search in a data deduplication system using a processor device in a computing environment, comprising:
    partitioning an input stream of data into input data chunks, the data chunks having a size of at least 16 Megabytes (MB);
    determining when and when not to apply the similarity search for an input data chunk based on a deduplication result of a previous input data chunk in the input stream of data; and
    avoiding the similarity search if the deduplication result of the previous input data chunk in the input stream of data is one of above and equal to a predetermined deduplication result threshold, thereby only calculating rolling hash values of the input data chunk when needed to be used in the similarity search in the data deduplication system of the computing environment such that the rolling hash values are calculated for only a portion of the input data chunks comprising those input data chunks used during the similarity search.

2. The method of claim 1, further including applying the similarity search if the deduplication result of the previous input data chunk in the input stream of data is one of below the predetermined deduplication result threshold and does not exist.

3. The method of claim 1, further including storing specifications of similar intervals produced by the similarity search in a data structure associated with the input stream of data, wherein any previous contents of the data structure are replaced.

4. The method of claim 3, further including calculating positions of a plurality of current similar intervals based on positions of a plurality of previous similar intervals by incrementing the positions of the plurality of previous similar intervals to reflect a plurality of current similar intervals immediately following the previous similar intervals.

5. The method of claim 1, further including defining the deduplication result of the previous input data chunk in the input stream of data as a total size of the portions of the previous input data chunk which are covered by matches to repository data divided by the total size of the previous input data chunk.

6. The method of claim 1, further including reprocessing the input data chunk with the similarity search applied if the deduplication result of a current input data chunk is below a predetermined deduplication result threshold after deduplication processing without the similarity search.

7. A system for conditional activation of a similarity search in a data deduplication system of a computing environment, the system comprising:
    the data deduplication system;
    a repository operating in the data deduplication system;
    a memory in the data deduplication system;
    a data structure in association with the memory in the data deduplication system; and
    at least one processor device operating in the computing storage environment for controlling the data deduplication system, wherein the at least one processor device:
        partitions an input data stream of input data into data chunks, the data chunks having a size of at least 16 Megabytes (MB),
        determines when and when not to apply the similarity search for an input data chunk based on deduplication results of a previous input data chunk in the input data stream, and
        avoids the similarity search if the deduplication result of the previous input data chunk in the input stream of data is one of above and equal to a predetermined deduplication result threshold, thereby only calculating rolling hash values of the input data chunk when needed to be used in the similarity search in the data deduplication system of the computing environment such that the rolling hash values are calculated for only a portion of the input data chunks comprising those input data chunks used during the similarity search.

8. The system of claim 7, wherein the at least one processor device applies the similarity search if the deduplication result of the previous input data chunk in the input stream of data is one of below the predetermined deduplication result threshold and does not exist.

9. The system of claim 7, wherein the at least one processor device stores specifications of similar intervals produced by the similarity search in the data structure associated with the input stream of data, wherein any previous contents of the data structure are replaced.

10. The system of claim 9, wherein the at least one processor device calculates positions of a plurality of current similar intervals based on positions of a plurality of previous similar intervals by incrementing the positions of the plurality of previous similar intervals to reflect a plurality of current similar intervals immediately following the previous similar intervals.

11. The system of claim 7, wherein the at least one processor device defines the deduplication result of the previous input data chunk in the input stream of data as a total size of the portions of the previous input data chunk which are covered by matches to repository data divided by the total size of the previous input data chunk.

12. The system of claim 7, wherein the at least one processor device reprocess the input data chunk with the similarity search applied if the deduplication result of a current input data chunk is below a predetermined deduplication result threshold after deduplication processing without the similarity search.

13. A computer program product for conditional activation of a similarity search in a data deduplication system using a processor device in a computing environment, the computer program product comprising a non-transitory computer-readable storage medium having computer-readable program code portions stored therein, the computer-readable program code portions comprising:
   an executable portion that partitions an input data stream of input data into data chunks, the data chunks having a size of at least 16 Megabytes (MB);
   an executable portion that determines when and when not to apply the similarity search for an input data chunk based on deduplication results of a previous input data chunk in the input data stream; and
   an executable portion that avoids the similarity search if the deduplication result of the previous input data chunk in the input stream of data is one of above and equal to a predetermined deduplication result threshold, thereby only calculating rolling hash values of the input data chunk when needed to be used in the similarity search in the data deduplication system of the computing environment such that the rolling hash values are calculated for only a portion of the input data chunks comprising those input data chunks used during the similarity search.

14. The computer program product of claim 13, further including an executable portion that applies the similarity search if the deduplication result of the previous input data chunk in the input stream of data is one of below the predetermined deduplication result threshold and does not exist.

15. The computer program product of claim 13, further including an executable portion that stores specifications of similar intervals produced by the similarity search in a data structure associated with the input stream of data, wherein any previous contents of the data structure are replaced.

16. The computer program product of claim 15, further including an executable portion that calculates positions of a plurality of current similar intervals based on positions of a plurality of previous similar intervals by incrementing the positions of the plurality of previous similar intervals to reflect a plurality of current similar intervals immediately following the previous similar intervals.

17. The computer program product of claim 13, further including an executable portion that defines the deduplication result of the previous input data chunk in the input stream of data as a total size of the portions of the previous input data chunk which are covered by matches to repository data divided by the total size of the previous input data chunk.

18. The computer program product of claim 13, further including an executable portion that reprocess the input data chunk with the similarity search applied if the deduplication result of a current input data chunk is below a predetermined deduplication result threshold after deduplication processing without the similarity search.

* * * * *